United States Patent [19]
Lankford et al.

[11] 3,748,073
[45] July 24, 1973

[54] DOUGH SHEETER
[76] Inventors: Floyd L. Lankford, 2743 E. 53rd St.; Paul W. Marshall, 3507 E. 21st St., both of Tulsa, Okla.
[22] Filed: June 30, 1971
[21] Appl. No.: 158,281

[52] U.S. Cl.................. 425/92, 425/337, 425/367
[51] Int. Cl........................... A21c 9/04, A21c 1/08
[58] Field of Search.................... 425/363, 367, 373, 425/168, 337, 92

[56] References Cited
UNITED STATES PATENTS

| | | | |
|---|---|---|---|
| 2,951,456 | 9/1960 | Olgiati.................................. | 425/92 |
| 2,784,683 | 3/1957 | Curtis et al..................... | 425/363 X |
| 2,814,260 | 11/1957 | Morgan........................... | 425/363 X |
| 2,888,886 | 6/1959 | Jorgenson et al................... | 425/101 |
| 3,119,719 | 1/1964 | Kott et al....................... | 425/363 X |

Primary Examiner—J. Spencer Overholser
Assistant Examiner—David S. Safran
Attorney—James R. Head and Paul H. Johnson

[57] ABSTRACT

This invention describes a device for accepting chunks of dough of irregular size and shape, and rolling out a continuous strip or sheet of dough of a selected width and thickness. The dough is placed in a bottomless hopper, from which it falls onto the surface of two counter-rotating drums, with parallel axes, in a horizontal plane. The surfaces of the drums are serrated, and the drums are synchronized to move downwardly together in the adjustably spaced gap between the drums. The serrations carry portions of the overlying dough mass toward the central gap, such as to form a continuous strip moving downwardly. This strip falls onto a horizontally moving belt that carries it to a pair of smooth-surfaced rollers that roll the strip to a final selected thickness.

7 Claims, 3 Drawing Figures

Patented July 24, 1973

INVENTORS
FLOYD L. LANKFORD
PAUL W. MARSHALL
BY
Head & Johnson
ATTORNEYS

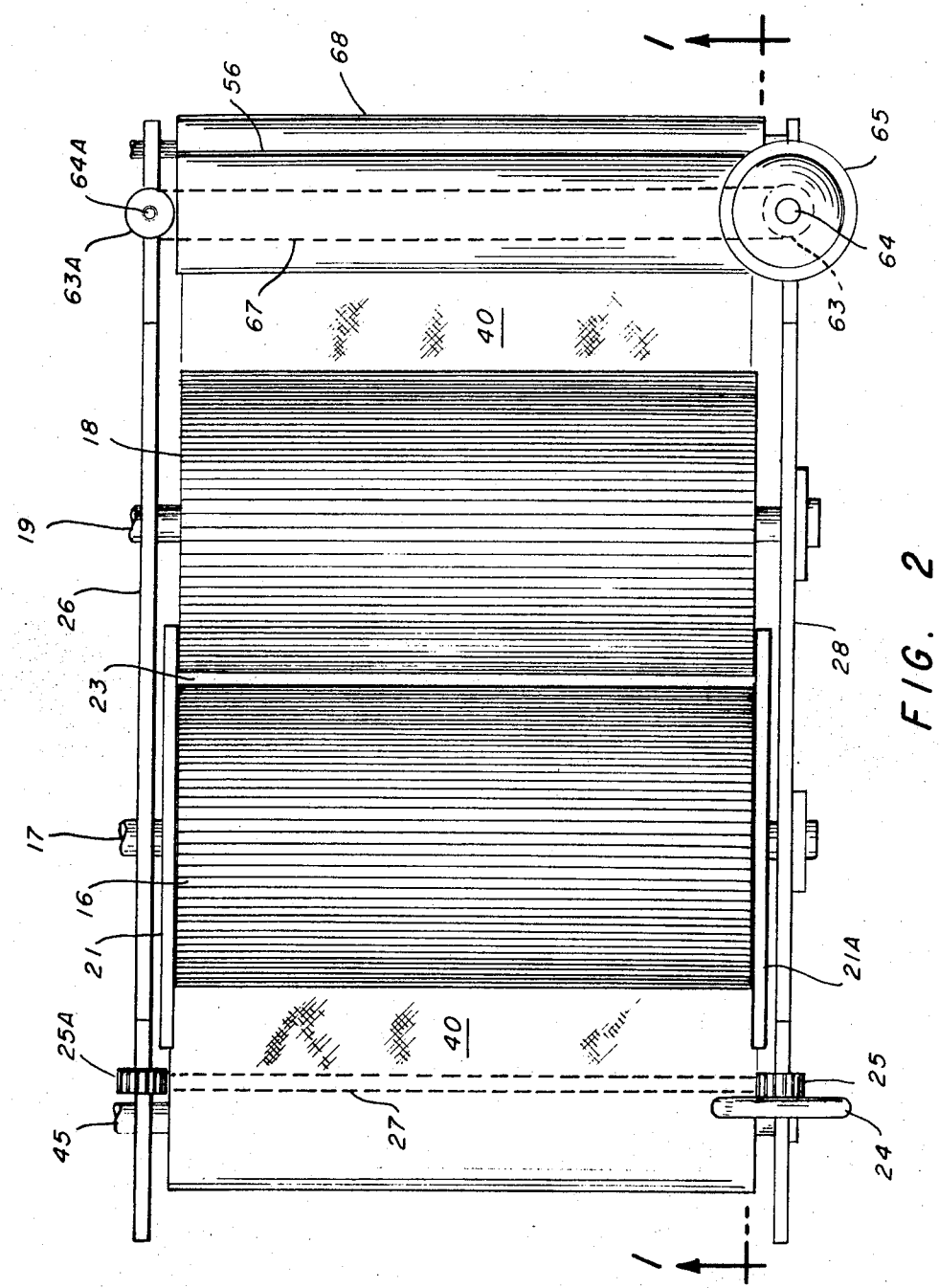
INVENTORS.
FLOYD L. LANKFORD
PAUL W. MARSHALL
BY
Head & Johnson
ATTORNEYS

DOUGH SHEETER

BACKGROUND OF THE INVENTION

1. Field of the Invention

This invention is in the field of food handling machinery, and particularly pie making machinery. More specifically it is concerned with the preparation of continuous strips or sheets of pie dough, in the manufacture of pies.

2. Description of the Prior Art

In the prior art, machines have been devised for rolling out sheets of dough. However, most of these require considerable manual handling of the dough in advance of the rolling operation. Others require many sets of rollers with means to press or force the dough into the rollers, and so on.

SUMMARY OF THE INVENTION

These difficulties and limitations of the prior art systems are overcome in the present invention by using a single pair of spaced, serrated drums set parallel to each other in a horizontal plane. The dough hopper is open in the bottom, and the dough rests directly on the top surfaces of the drums. The drums rotate in synchronism, approaching each other at the top. The serrations catch the dough and pull it toward the center, where it is churned and worked and formed into a thin strip of dough of width equal to the length of the drums. The dough falls onto a horizontally moving belt, where it has a chance to relax before it passes through a set of smooth-surfaced rollers, the purpose of which is to roll out the effect of the drum serrations, and to roll the strip to a final selected thickness.

Thus, the object of this invention is to provide a device for accepting chunks of dough of irregular size and shape, and to convert them into a continuous smooth strip of uniform width and selected adjustable thickness.

These and other objects and the details and principles of this invention will be better understood from the following description, taken in conjunction with the appended drawings, in which:

BRIEF DESCRIPTION OF THE DRAWINGS

FIGS. 1 and 2 show elevation and plan views respectively of one embodiment of this invention.

DESCRIPTION OF THE PREFERRED EMBODIMENTS

Figures 1, 3:
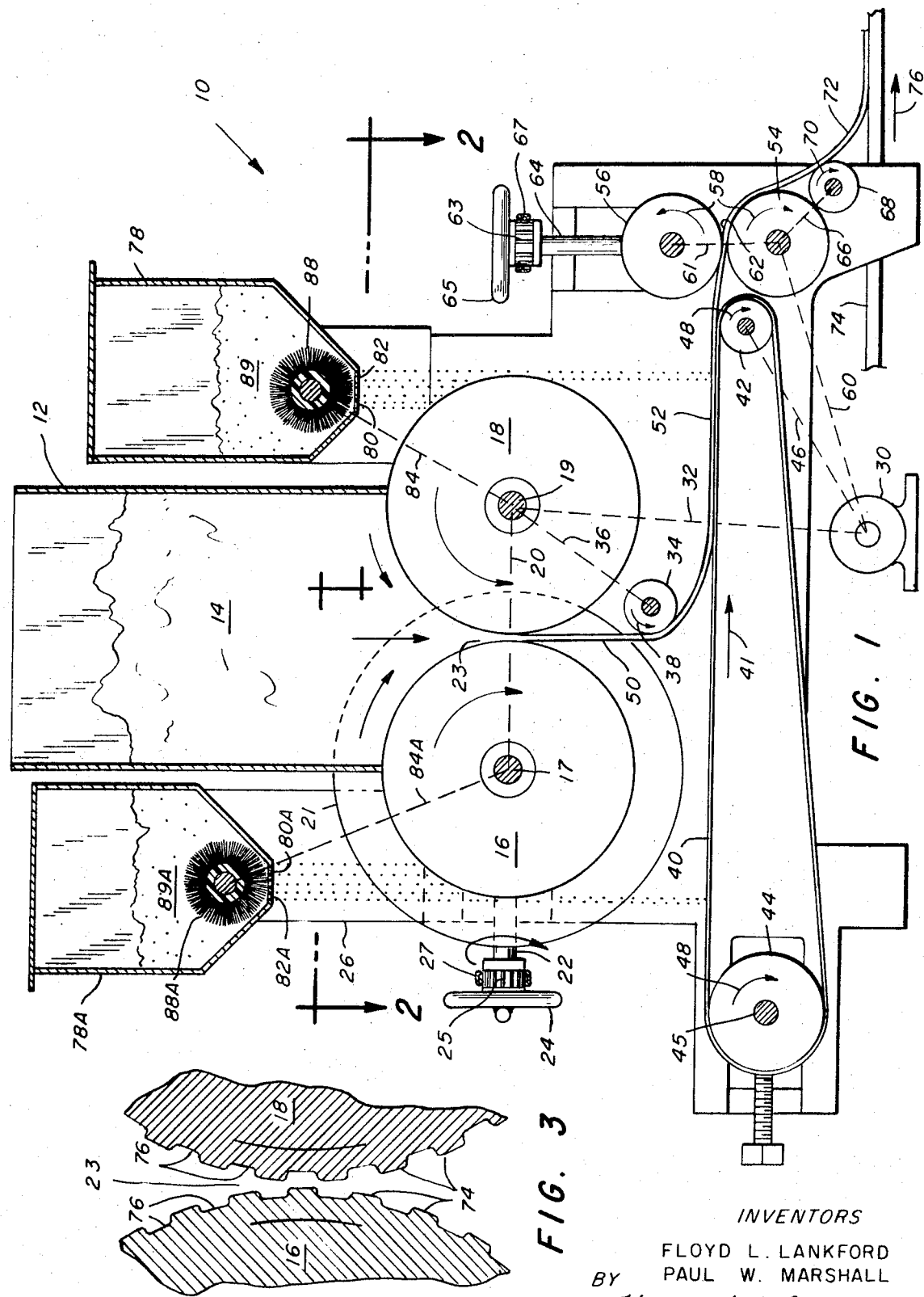

Referring now to the drawings, FIGS. 1 and 2 show elevation and plan view of the apparatus of this invention, partly in schematic form. The apparatus, called a dough sheeter, is indicated generally by the numeral 10. It consists of two drums 16 and 18, shown to be of the same diameter, although in this invention they are not limited to the same diameter. The drums are on parallel axis 17, 19 in a horizontal plane. The spacing in the gap 23 is adjustable by means of screw 22, and handle 24. Chain 27 and sprockets 25 and 25A serve to move both ends of drum 16 at the same time so as to have the two drums accurately parallel at all times.

The surfaces of the two drums are serrated, as shown in FIG. 3, comprising alternate lands 74 and intermediate shallow rounded channels 76. The circumferential width of the lands and channels are approximately equal, although it may be desirable to have the lands slightly wider than the grooves. Typical dimension of the lands is nine thirty-seconds inch and for the grooves is one-fourth inch. The grooves are approximately 0.005 inch deep. There are no sharp edges or corners. A typical drum diameter is approximately 10 inches.

The drums are synchronized by means 20, which might be a chain, or other means, so as to turn in synchronism. The drums turn toward each other on top, and downward together in the gap 23, the drums being positioned such that a land on one drum comes opposite a groove on the other, and vice versa.

A dough hopper 12 is placed above the drums 16, 18. It is approximately as long as the length of the drums, and is approximately as wide as the diameter of a drum. There is no bottom to the hopper, and the dough 14 loaded in at the top falls until it rests on the top of the drums. In the motion of the drums toward the gap 23, the serrations on the drum pick up particles of dough and carry them toward the gap. This action tends to beneficially mix and knead the dough, which is finally squeezed into and through the gap 23 as strip 50, of a thickness which is a function of the magnitude of gap 23. The side plates 21, 21A provide end seals to the gap 23 to prevent extrusion of the dough.

A stripping roller 34, which is a smooth-surfaced, small, fast-rotating, roller, turning in the direction 38, serves to separate the moving strip 50 from the drums 16 and 18 and to assist it to make a change in direction from the downward vertical direction at 52, where it is supported on a moving continuous belt 40 moving in the direction 41. The belt 40 is driven around rollers 42 and 44, which are driven by motor 30 through means 46.

A pair of smooth-surfaced, counter-rotating rollers 54, 56 are mounted in a vertical plane with their axes parallel, and spaced apart, so as to form a gap 62 of adjustable dimension, controlled by screws 64. The gap 62 is positioned in the plane of the surface of belt 40 so that the strip 52 being carried by the belt will move directly into the gap 62, where the dough will be squeezed down to final selected thickness. After leaving the rollers 54, 56, the strip 72 slumps down over stripper roller 68, which is smooth-surfaced, and is turning at a higher surface speed than the speed of the strip. The strip then drops onto a second belt 74 moving in direction 76 for further processing.

Two flour sprinkler boxes 78, 78A are mounted above the drums 18 and 16. In the boxes are rotating brushes 88, 88A which sprinkle flour 89, 89A through small perforations 80, 80A and 82, 82A. The flour falling through openings 80, 80A, falls on the drums 18, 16 respectively giving them a light coating of flour to prevent the dough from sticking to them. The flour falling through opening 82A falls on belt 40 and coats the belt and thus the underside of strip 52 with flour. The flour falling through opening 82 falls on the top of strip 52. Thus the strip is coated with flour on both surfaces prior to passing through rollers 54, 56 to avoid sticking to them. The brushes 88, 88A are driven by means 84, 84A respectively.

All of the shafts supporting the drums 16, 18, rollers 54, 56, strippers 34, 68 and belt rollers 42, 44 must be synchronized and have their speeds precisely adjusted to maintain the proper speed of travel of the strip through the system. This is accomplished by driving all shafts, including the flour brushes, from the same motor 30, through the various drive means indicated, which can conveniently comprise chains and sprockets.

Obviously also, the speed of belt 74 must be matched to the speed of the strip 72.

The distance between the gap 23, along the path of the strip 50, 52 to the gap 62 is important. The dough worked by the top surfaces of the drums and formed into the strip 50 is given time to relax before it is again worked in the gap 62 of the rollers 54, 56. This relaxation is beneficial in providing a dough with ideal characteristics. Although this spacing is not critical, experiment has indicated that without the second working through rollers 54, 56 or with the rollers 54, 56 placed just below the drums 16, 18, the resulting condition of the dough strip is not as good as it is with the arrangement shown in FIG. 1. In this regard also, it was found that the action of the lands and grooves of the drums in feeding the dough into the gap 23 provides a useful working and kneading of the dough.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. A machine for producing continuous sheets of pie dough of selected thickness comprising:
    a. two counter-rotating drums with axes parallel and in a horizontal plane, the spacing between the axes adjustable to form a gap between the two drums, the circumferential surface of the drums comprising alternate lands and shallow grooves, said drums synchronized to turn at the same speed with the lands of one drum opposite the grooves of the other, and the motion of both surfaces downward in the region of said gap;
    b. a rectangular dough hopper with open bottom positioned over said drums whereby the dough in said hopper rests on the mutually approaching surfaces of said drums and is drawn into the gap between said drums and dropped as a continuous sheet of dough;
    c. a horizontally travelling continuous belt adapted to accept the dropping sheet of dough and carry it horizontally;
    d. a pair of spaced, smooth-surfaced cylindrical rollers, with axes parallel and in the same vertical plane, the spacing between said axes adjustable, the gap between said rollers positioned substantially in the same plane as said belt; and
    e. a dough stripper comprising a smooth-surfaced roller positioned below said drums and having a surface speed greater than the speed of said sheet and positioned such as to assist the sheet in turning from a vertical to a horizontal direction of motion;
    whereby said drums carry dough into the gap to form a sheet of dough, which sheet stripped by said stripper, is carried to said rollers by said belt and rolled to a selected thickness by said rollers.

2. The dough sheeter as in claim 1 including means to synchronize the speeds of said drums, said belt, and said rollers.

3. The dough sheeter as in claim 1 including a second dough stripper comprising a smooth-surfaced roller positioned adjacent the lowermost of said two rollers, having a surface speed greater than the speed of said sheet.

4. The dough sheeter as in claim 1 including means to sprinkle flour on said drums and on said belt.

5. The dough sheeter as in claim 1 including frame means comprising:
    a. two parallel vertical plates spaced apart by the length of said drums;
    b. means to hold said plates in spaced relation; and
    c. said hopper of substantially the same length as the length of said drums, and of a width equal approximately to the diameter of said rollers.

6. The dough sheeter as in claim 1 in which said drums are of the same diameter.

7. The dough sheeter as in claim 1 in which the drum diameter is approximately 10 inches and said lands are approximately nine thirty-seconds inch wide and said grooves are approximately one-fourth inch wide and 0.005 inch deep.

* * * * *